J. W. MARTIN.
ANTIRATTLER.
APPLICATION FILED SEPT. 20, 1921.
1,424,577. Patented Aug. 1, 1922.
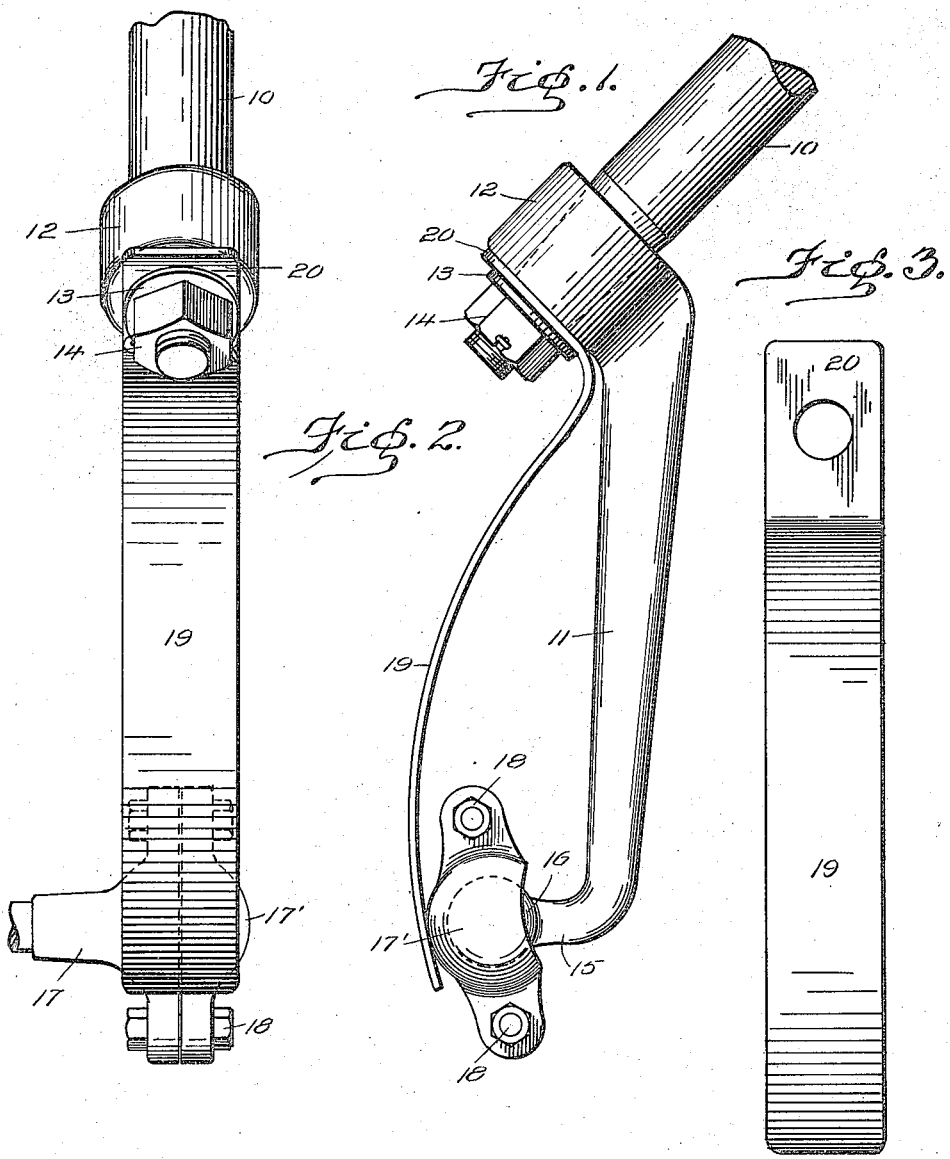

UNITED STATES PATENT OFFICE.

JORGEN W. MARTIN, OF MORA, MINNESOTA.

ANTIRATTLER.

1,424,577. Specification of Letters Patent. Patented Aug. 1, 1922.

Application filed September 20, 1921. Serial No. 502,011.

*To all whom it may concern:*

Be it known that I, JORGEN W. MARTIN, a citizen of Norway, residing at Mora, in the county of Kanabec and State of Minnesota, have invented certain new and useful Improvements in Antirattlers, of which the following is a specification.

This invention appertains to anti-rattling devices generally, and has for its principal object to provide for a type of such devices adapted for use in retaining the ball end of the steering gear ball arm of Ford automobiles in engagement with the bearing bracket or socket thereof, and in a manner to prevent the noisy rattling of the parts during the operation of the automobile.

With the foregoing and other objects in view, the invention resides in the certain novel and useful construction and arrangement as will be hereinafter more fully described, set forth in the appended claims, and illustrated in the accompanying drawing, in which:—

Figure 1 is a side elevation of the ball arm and its bearing bracket or socket of a Ford automobile, the ball arm being attached to the lower fragmentary portion of the usual steering gear or post thereof, and showing the preferred embodiment and application of the anti-rattler thereto.

Figure 2 is a front elevation, and,

Figure 3 is a front elevation of the anti-rattler device per se.

Referring to the drawing, the numeral 10 designates the lower end portion of the ordinary steering post of a Ford automobile, on which is attached the usual form of ball arm 11 which has an enlarged eye portion 12 angularly disposed with respect to the upper end of the arm portion 11 and engaged over the lower free end of the post 10, and is secured thereon by means of the usual washer 13 and lock nut 14. The lower end of the arm 11 terminates in an angularly disposed extended portion 15 formed at its free end with a spherical enlargement or ball 16, which is engaged in a bearing bracket or socket comprising two parts 17 and 17′ secured together by means of bolts 18.

The anti-rattling device per se comprises a suitable length of spring steel 19 having an upper end portion 20 angularly bent and apertured for engagement on the free end of the steering post 10, and is secured in position by the washer 13 and the locked nut 14 in abutting relation with respect to the outer face of the connected portion 12 of the ball arm 11. The major length of the device 19, downward from the angularly bent portion 20, is curved in a manner so that, when it is properly positioned, the lower free end of the curved portion 19 will be tensioned against the outer curved adjacent faces of the connecting parts 17 and 17′ of the bearing bracket, whereby the tension of the spring length portion of the device will oppose any and all loose play of the ball end 16, of the ball arm 11, in the bracket or socket and prevent the accidental disengagement of the said ball end 16 therefrom. The tension of the spring device, in practice, will be of a sufficient strength to prevent any and all free play of the ball arm, and, consequently, will eliminate the noisy rattling thereof during the operation of the automobile.

From the foregoing, it will be readily apparent that the invention provides for an extremely simple and inexpensive construction and arrangement of the device, and one which is durable and efficient in operation, and also, that, while a preferred embodiment of the same has been described and illustrated herein in specific terms and details, various changes in and modifications thereof may be resorted to without departing from the spirit of the invention, or the scope of the claims appended hereto.

Having thus fully described the invention, what is claimed, is:—

1. The combination with a steering post of an automobile including the ball arm thereof and bearing socket of the ball arm, and means connecting the steering post and arranged to bear against the bearing socket of the ball arm in a manner to prevent the disengagement of the latter from the bearing socket or the free noisy play of the ball end of the ball arm in the bearing socket.

2. The combination with the steering post of an automobile including the ball arm thereof and the bearing socket of the ball arm, and spring tensioned means connecting the steering post and arranged to bear against the bearing socket of the ball arm in a manner to prevent the disengagement of the latter from the bearing socket or the free noisy play of the ball end of the ball arm in the bearing socket.

3. The combination with the steering post of an automobile including the ball arm thereof and the bearing socket of the ball arm, and a member of spring steel secured on the free lower end of the steering post and adapted to bear against the bearing socket of the ball arm in a manner to prevent the disengagement of the latter from the bearing socket or the free play of the ball end of the ball arm in the bearing socket.

4. The combination with the steering post of an automobile including the ball arm thereof and the bearing socket of the ball arm, and a member of spring steel secured on the lower free end of the steering post with the upper end portion of the ball arm and adapted to bear against the bearing socket of the ball arm in a manner to prevent the disengagement of the latter from the bearing socket or the free play of the ball end of the ball arm in the bearing socket.

In testimony whereof, I affix my signature hereto.

JORGEN W. MARTIN.